C. & J. KEELER.
Smut Mill.
No. 9,261.
Patented Sept. 14, 1852.
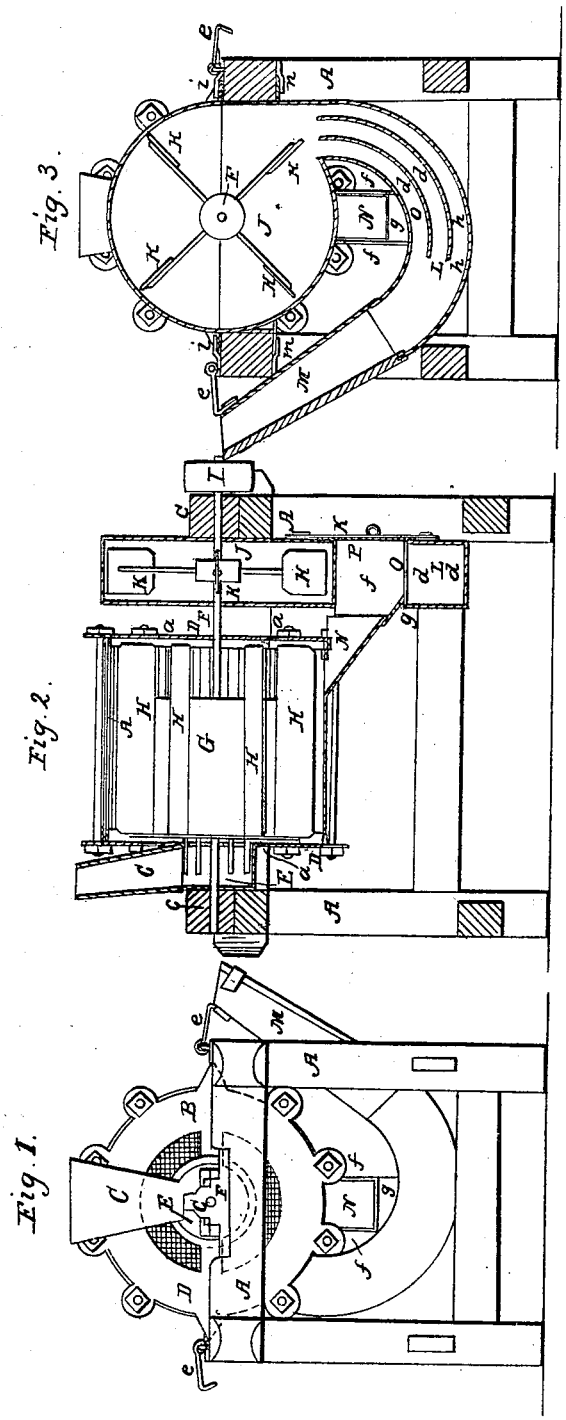

UNITED STATES PATENT OFFICE.

CHAS. KEELER AND JAS. KEELER, OF UNION, NEW YORK.

SMUT-MACHINE.

Specification of Letters Patent No. 9,261, dated September 14, 1852.

*To all whom it may concern:*

Be it known that we, CHARLES KEELER and JAMES KEELER, both of Union, in the county of Broome and State of New York, have invented certain new and useful Improvements in Smut-Machines; and we do hereby declare that the following is a full, clear, and exact description of the same, reference being had to the accompanying drawings, forming part of this specification, in which—

Figure 1, is an end elevation of the machine, as improved by us. Fig. 2, is a longitudinal vertical section of the same taken through the center. Fig. 3, is a transverse vertical section of the same taken through the wind chest and passages.

Similar letters of reference indicate corresponding parts in each of the several figures.

The nature of this invention consists in constructing the wind passages, and spouts, in such a manner as to allow of their being turned to either side to allow the machine to be driven in either direction.

To enable others skilled in the art to make and use our invention we will proceed to describe its construction and operation.

A, is the frame of the machine.

B, is the drum having openings $a$, $a$, in each end D, covered by wire gauze or other material previous to air; its periphery is formed in the same manner as that of other smut machine drums.

C, is the hopper and E, a cylindrical box connected to the same, and surrounding the shaft; there is an opening in the end of the drum to which the box is attached corresponding in size with the said box.

F, is the shaft passing through the center of the drum, and resting in suitable bearings, $c$, $c$, on the frame; it carries the beater cylinder G, provided with beaters H, H, of well known form, and is furnished with a pulley I which receives motion through an endless band.

J is the wind chest, which is formed in two parts. $i$, $i$, are lips to the upper half which rest upon the top of the frame and are secured by buttons or other fastenings to hold the upper half of the wind chest in its place; $n$, $n$, are similar lips on the lower half of said wind chest by which it is secured to the under side of the frame with buttons in like manner, so that the entire wind chest can be released from the frame at pleasure without disturbing any other part of the machine.

K, K, are the fans which are secured to the shaft F.

L, is the wind pipe which is divided by partitions $d$, $d$, into three passages; it descends from one side of the wind chest and curving under the wind chest turns upward: the partitions extend to the lowest part of the bend. In the bottom of the bend there are two openings $h$, $h$. A movable spout M, is fitted to the end of the wind pipe, being secured at its upper end by a hook fastening, $e$, to the frame A.

N, is a spout inclining from the bottom of the drum toward the wind pipe, and O, is an opening in the upper side of the wind pipe, below the said spout N.

P, is a plate having two plates $f$, $f$, attached to it, which are at a distance apart sufficient to fit close to the sides of the spout N, being of sufficient depth to fit between the bottom of the wind chest and the top of the wind pipe; a plate $g$, placed across $f$, $f$, fits to the bottom of the spout N; the plate P, fits close up to the wind chest and wind pipe, and with the plates attached, forms a drawer, which makes a movable continuation of the spout N, to the opening O. The drawer is secured in place by a sliding bolt $k$. When the wind spout is turned to the opposite side of the frame, another drawer similar to this, but of the reverse form is substituted the one being right handed the other left handed.

The operation of the machine is as follows: The grain is fed into the hopper C, and passing through the box E, into the drum, is subjected to the action of the beaters. Currents of air are caused, by the partial vacuum produced by the revolution of the beaters, to enter the openings $a$, $a$.

The grain, after the separation of the smut is effected by the beaters, passes down the spout N, and through the drawer, and enters the wind pipe through the opening O; in the wind pipe it is met by the blast which carries all the smut, dust, and other extraneous matter which did not pass through the sides of the drum, up the spout M, from which it is discharged, the grain falling out through the openings $h$, $h$. This operation, except that the air is admitted at each end of the drum is substantially the same as that of other machines. In other machines, however, it is not usual to provide for driving in either direction, and no provision is made for changing the position of the wind pipe and appendages with any degree of facility, while this can be made a right-handed or left-handed machine in the following manner. The spout M, can be lifted off by merely unfastening the hook fastening $e$; and the drawer P, $f$, $f$, $g$, can be removed when the bolt $k$, is withdrawn; the buttons or fasteners which hold the lower half of the wind chest in its place to the under side of the frame may then be released, when it and the wind pipe can be taken from the frame and turned around so as to make the pipe turn to the opposite side and there secured by the buttons as before; the spout M can then be replaced and the reverse sided drawer P, $f$, $f$, $g$, substituted for the one before used, and being secured by the bolt $k$, the machine is ready for operation in the contrary direction.

What we claim as our invention and desire to secure by Letters Patent, is—

Making the blowing apparatus with the drawer P, $f$, $f$, $g$, and spouts M, movable substantially as described so as to allow of the wind chest J, and pipe L, being easily taken out and turned in either direction to admit of the machine being driven in whichever direction may be desired.

CHARLES KEELER.
JAMES KEELER.

Witnesses:
FRANCIS B. SMITH,
E. DANIELS.